United States Patent [19]
Balakrishnan et al.

[11] Patent Number: 6,147,883
[45] Date of Patent: Nov. 14, 2000

[54] OUTPUT FEEDBACK AND UNDER-VOLTAGE DETECTION

[75] Inventors: Balu Balakrishnan; Alex Djenguerian, both of Saratoga; Leif Lund, San Jose, all of Calif.

[73] Assignee: Power Integrations, Inc., Sunnyvale, Calif.

[21] Appl. No.: 09/192,960

[22] Filed: Nov. 16, 1998

[51] Int. Cl.[7] .................................................... H02H 7/10
[52] U.S. Cl. ............................ 363/49; 363/50; 323/315
[58] Field of Search ................................. 363/49, 50, 55, 363/56; 323/313, 315, 276, 282

[56] References Cited

U.S. PATENT DOCUMENTS

| | | | |
|---|---|---|---|
| 5,264,782 | 11/1993 | Newton | 323/288 |
| 5,510,699 | 4/1996 | Theus et al. | 323/312 |
| 5,698,970 | 12/1997 | Stanojevic | 323/223 |
| 5,747,978 | 5/1998 | Gariboldi et al. | 323/313 |
| 5,798,635 | 8/1998 | Hwang et al. | 323/222 |

OTHER PUBLICATIONS

Ashok Bindra, "Power–Conversion Chip Cuts Energy Wastage in Off–Line Switchers," *Electronic Design*, pp. 46,48, Oct. 1998.

*Primary Examiner*—Adolf Deneke Berhane
*Attorney, Agent, or Firm*—Blakely Sokoloff Taylor & Zafman, LLP

[57] ABSTRACT

A switched mode controller for properly handling an under-voltage condition in a power line which includes a current mirror for receiving current from the power line; a reference current source coupled to the current mirror for supplying a reference current; and a power transistor coupled to the reference current source, the power transistor generating a pulse width modulated signal when current from the power line exceeds the reference current, the power transistor being disabled when current from the power line is less than the reference current.

20 Claims, 3 Drawing Sheets

OUTPUT FEEDBACK AND UNDER-VOLTAGE DETECTION

BACKGROUND

The present invention relates to a switched mode control system with output feedback and under-voltage detection.

Quantum leaps in electronic technology have led to the development of "smart" electrical and electronic products. Each of these products requires a steady and clean source of power from a power supply. In one common power supply known as a switching power supply, an integrated circuit (IC) regulator is connected in series with a primary winding of a transformer to the high voltage direct current (DC) input derived from alternating current (AC) power line through rectification and filtering. Energy is transferred to the secondary winding in a manner controlled by the IC regulator so as to provide a clean and constant output voltage. Another winding called a feedback or bias winding may be used to provide a feedback signal to the IC regulator. Alternately, the feedback signal can come through an opto-coupler from a sense circuit at the secondary output. The feedback signal is used to modulate the duty cycle of the IC regulator or used to allow or disallow cycles in order to control the secondary output.

When the power supply is turned on or off, a temporary uncertainty exists in the output of the power supply. The uncertainty leads to transients or glitches in the output voltage. The condition may cause the output of the power supply to fluctuate unpredictably. For instance, the power supply output may go to zero volts and come back up partially several times during power-down (glitch). Power supplies with auto-restart circuit, which are designed to restart the power supply periodically under fault conditions, are susceptible to such glitches during power-down. Since digital and analog ICs used in modern products are highly sensitive to fluctuations in their voltage supply, such an under-voltage condition may lead to erratic or inoperative products.

SUMMARY

A circuit detects an under-voltage condition at a voltage input of a power supply. In one aspect, the circuit has a current mirror for receiving current representing the voltage input to the power supply; and a reference current source coupled to the current mirror to generate an under-voltage signal when the reference current exceeds the current from the power supply voltage input. The power supply is disabled when the under-voltage signal is generated.

Implementations of the invention include one or more of the following. The under-voltage condition is detected during power up and/or during an off cycle of an auto-restart operation of the power supply. A resistor may be connected to the power supply input voltage and a first isolation transistor may be connected between the resistor and the current mirror. The current mirror may include a first transistor having a gate and a drain, the gate being connected to the drain and a second transistor having a gate, the gate of the second transistor connected to the gate of the first transistor. The reference current source may be connected to the second transistor. The resistor may be connected to the power supply voltage input at an electrical terminal. A second current source and a second isolation transistor may be connected between the second current source and the electrical terminal to receive a feedback signal. A latch may be connected to the output of the second reference current source to receive the feedback signal. The electrical terminal receives, both the feedback signal and the under-voltage signal. Further, only one of the first and second isolation transistors may conduct at a time.

In a second aspect, a method for handling an under-voltage condition at a voltage input of a power supply includes sensing an input current representing the voltage input of the power supply; generating a reference current; comparing the input current with the reference current; detecting the under-voltage condition when the reference current exceeds the input current; and disabling the power supply when the under-voltage condition is detected.

Implementations of the invention include one or more of the following. The under-voltage condition may be detected during power up and during an off cycle in an auto-restart operation of the power supply. The input current may be mirrored by passing the input current through a first transistor having a gate and a drain, the gate being connected to the drain; and passing the input current through a second transistor having a gate, the gate of the second transistor connected to the gate of the first transistor. The input current and a feedback signal may be received on one electrical terminal. A second reference current source may be connected to the electrical terminal to receive a feedback signal. Current flow from the second current source to the electrical terminal may be isolated when detecting the under-voltage condition. The feedback signal from the electrical terminal may be latched. The method may include isolating the electrical terminal and a second current source during predetermined periods. Where a second isolation transistor is connected between the electrical terminal and the current mirror, the method may include comprising conducting each of the first and second isolation transistors one at a time. The method also includes detecting if a fault condition exists and if so, disabling a power switching transistor in the power supply.

In another aspect, a regulator circuit is connected in series with a transformer primary winding to an input voltage. The regulator circuit includes a resistor coupled to the input voltage, the resistor providing an input current representing the input voltage; a current mirror coupled to the resistor for mirroring the input current; and a reference current source coupled to the current mirror to generate an under-voltage signal when the reference current exceeds the input current, the power supply being disabled when the under-voltage signal is generated.

Implementations of the invention include one or more of the following. The under-voltage signal is detected during power up and/or during an off cycle in an auto-restart operation of the regulator circuit. A transistor may be connected between the resistor and the current mirror. The current mirror may include a first transistor having a gate and a drain, the gate being connected to the drain and a second transistor having a gate, the gate of the second transistor connected to the gate of the first transistor. A second reference current source may be used, and a first isolation transistor may be connected between the second current source and the resistor. A latch may be connected to the output of the second reference current source for receiving a feedback signal. The feedback signal and the under-voltage signal may be received by one electrical terminal. A second isolation transistor may be connected between the electrical terminal and the current mirror, wherein each of the first and second isolation transistors conducts one at a time. A power switching transistor may be connected to the under-voltage signal.

In another aspect, a power supply circuit has an under-voltage detector for receiving a signal representing an input voltage on an electrical terminal to detect under-voltage condition, the power supply being disabled when the under-voltage condition is detected. The circuit has a circuit for receiving a feedback signal on the electrical terminal. The feedback signal is used to regulate the power supply output.

Implementations of the invention include one or more of the following. The under-voltage signal may be a current proportional to the input voltage. The current may flow through a resistor coupled between the input voltage and the electrical terminal. The feedback signal may be digital.

In yet another aspect, a power supply includes an auto-restart circuit for alternatingly disabling and enabling the power supply when the power supply is under a fault condition. The power supply also has an input under-voltage detector to detect an input under-voltage condition when the power supply is disabled by the auto-restart circuit and during power-up.

An implementation of the invention may prevent the power supply from being enabled following the detection of the input under-voltage condition until the input under-voltage condition is removed.

In another aspect, a method for handling an under-voltage condition at an input voltage of power supply circuit includes receiving an input signal representing the input voltage on an electrical terminal, the electrical terminal carrying the input signal and a feedback signal to regulate the power supply output; providing feedback control for the power supply based on the feedback signal carried by the electrical terminal; detecting an under-voltage condition based on the input signal; and disabling the power supply when the under-voltage condition is detected.

In another aspect, a method for handling an under-voltage condition at an input voltage of power supply circuit includes detecting an input under-voltage condition during the disabling of the power supply and during power-up; and alternatingly disabling and enabling the power supply when the input under-voltage condition is present.

Advantages of the invention include one or more of the following. The power supply output behaves in a predictable manner when power is turned on and off or during input power interruptions. The invention prevents glitches at the output when power is turned on and off. The invention requires only one resistor external to the regulator to sense input voltage. The number of external components is reduced. Only one input is required to supply feedback information and under-voltage information to the regulator. Thus the number of electrical terminals required for the regulator is reduced. The reduction in electrical terminals in turn reduces circuit area in the regulator dedicated to protect the regulator against latch-up and electrostatic discharge (ESD) conditions. Further, a small package with a low pin count may be used. Such a small package reduces printed circuit board (PCB) wiring complexities and PCB area. The reduction in terminal count also allows one or more terminals to be used as an extra thermal conduction path between the regulator to a heat sink on a PCB for rapid heat dissipation.

DESCRIPTION

Figure 1:
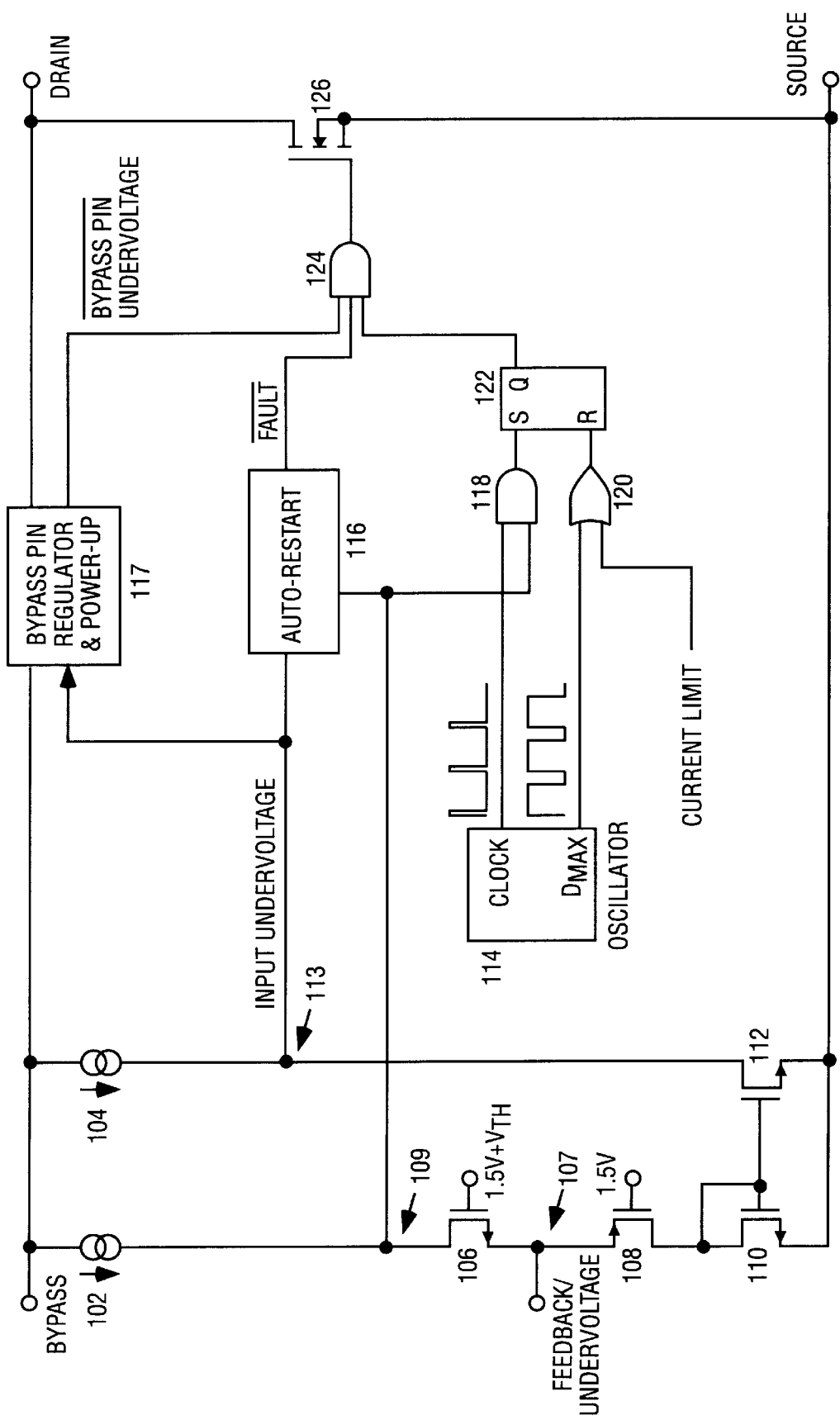
FIG. 1 is a schematic diagram of a circuit for receiving output feedback and detecting under-voltage conditions on the AC line.

Referring now to FIG. 1, a schematic diagram of a circuit for receiving feedback from the output and for detecting an under-voltage condition in the power line is shown. The circuit may be provided within an IC regulator. A first reference current source 102 and a second reference current source 104 in the regulator are connected to an external by-pass capacitor at the supply terminal (by-pass) of the regulator. The current reference sources 102 and 104 may be p-channel reference current sources and each reference current source may provide about 50 micro-amperes of current.

The output of the current source 102 is provided to a node 109 which is connected to the drain of a transistor 106. Transistor 106 may be an n-MOS transistor whose gate is tied to the sum of 1.5 volts and a threshold voltage. The source of transistor 106 is connected to a feedback/under-voltage terminal 107. Terminal 107 is connected to a resistor 132 (FIG. 2) which is connected to the input DC voltage of the power supply. Current flowing through resistor 132 (FIG. 2) is used to detect under-voltage conditions.

Also connected to the feedback/under-voltage terminal 107 is transistor 108 which may be a p-MOS transistor. The p-MOS transistor 108, whose gate is tied to 1.5 volts, isolates an under-voltage detector (discussed below) from the rest of the circuit. Transistor 108 in turn is connected to a transistor 110 whose gate is commonly tied to the gate of another transistor 112. The gate and drain of transistor 110 are connected. Both transistors 110 and 112 may be n-MOS type transistors. The combination of transistors 110 and 112 form a current mirror. The output of the transistor 112 is connected to the reference current source 104 at a junction 113 which provides a "LINE-UNDERVOLTAGE" signal to a fault detection circuit 116. In this embodiment, transistors 108, 110 and 112, along with reference current source 104, form the under-voltage detector.

Junction 109 between the reference current source 102 and transistor 106 drives one input of an AND-gate 118. The other input of the AND-gate 118 is connected to an oscillator 114 which supplies a clock signal for the regulator. The output of the AND-gate 118 is provided to a set input of a latch 122. A second output from the oscillator 114 which supplies a second clock signal with a maximum clock duty cycle is provided to an inverted input of an OR-gate 120. The other input of OR-gate 120 receives a current limit signal from the regulator. The output of OR-gate 120 is provided to a reset input of the latch 122.

The output of the latch 122 is provided to one input of an AND-gate 124. Another input of AND-gate 124 is provided by auto-restart circuit 116 which performs fault detection. The third input of AND-gate 124 is provided by the bypass pin regulator and power-up circuit 117. This input will be in the low state during power-up until the bypass pin reaches its regulated voltage of 5.8 volts.

The auto-restart circuit 116 receives an input under-voltage signal from junction 113 between the transistor 112 and the reference current source 104. If transistor 112 pulls more current than current source 104 can supply, junction 113 goes low which indicates that an input under-voltage condition does not exist. Alternatively, if transistor 112 pulls less current that supplied by the current source 104, junction 113 goes high, indicating that an input under-voltage condition does exist. The auto-restart circuit alternatively enables and disables the power transistor 126 when the power supply is experiencing fault conditions such as output overload or output short. The presence of an input undervoltage condition during the off cycle (disable) of auto-restart causes circuit 116 to continue asserting a fault signal to AND-gate 124 until the input under-voltage condition goes away. The bypass pin regulator and power-up circuit 117 regulates the bypass pin to 5.8 volts. There is an external capacitor connected to this pin. During power-up the bypass pin capacitor is charged by the bypass pin regulator until it reaches its regulated voltage of 5.8 volts. However, during power-up if the input under-voltage condition exists, the bypass pin will charge up only to 5.1 volts and held there. When the input under-voltage condition goes away, the bypass pin capacitor will charge up from 5.1 volts to its regulated voltage of 5.8 volts. The output of AND-gate 124 in turn is provided to the gate of power transistor 126 connected between a drain input and a source input of the regulator. If a fault signal is asserted or if bypass pin has not reached 5.8 volts during power-up, AND-gate 124 shuts off the power transistor 126. In this manner, the input under-voltage condition causes power transistor 126 to be disabled until the input under-voltage condition goes away.

Figure 2:
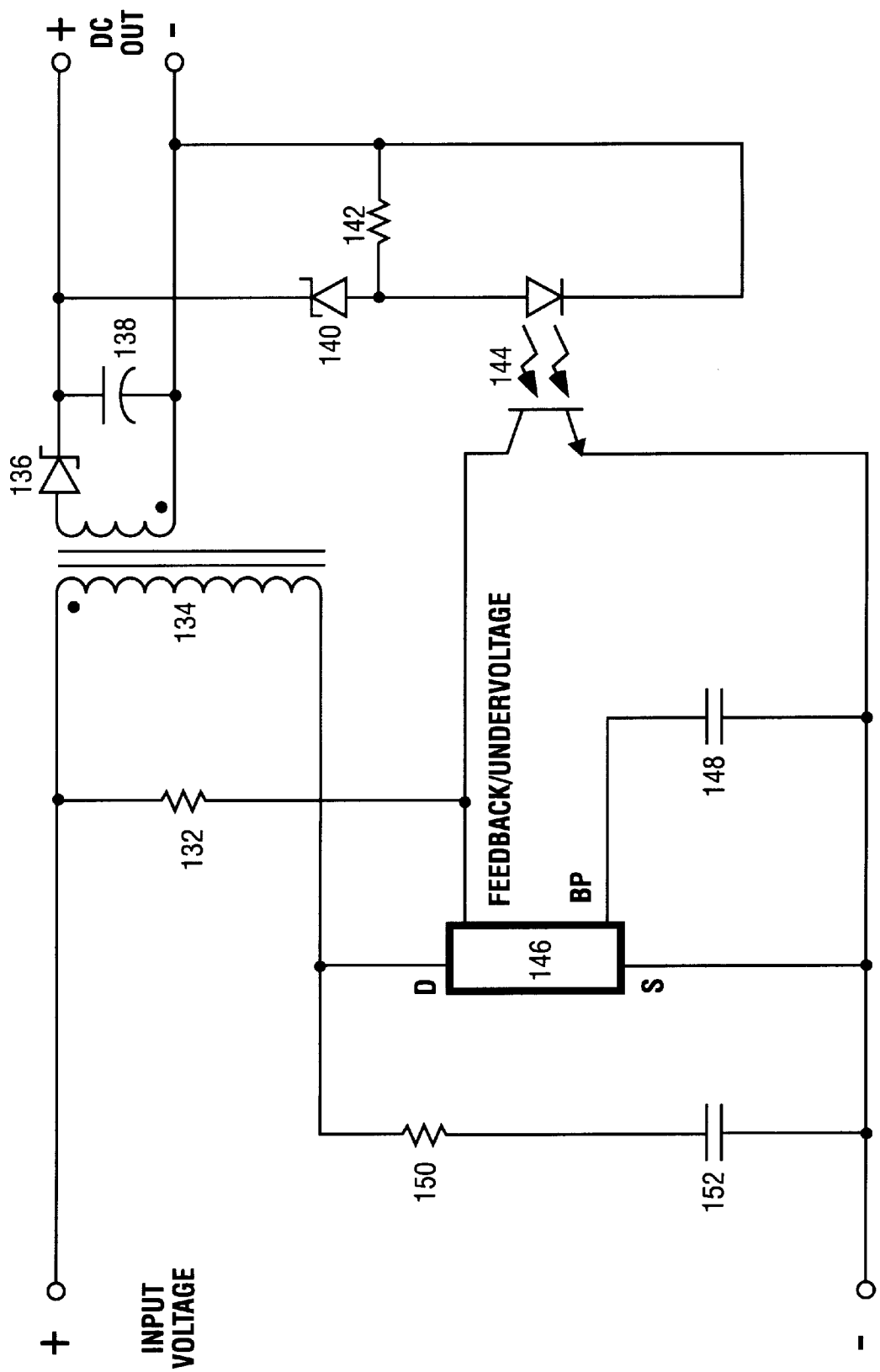
FIG. 2 is a schematic of a power supply.

The circuit of FIG. 1 also receives a feedback signal through feedback/under-voltage terminal 107. During operation, when current is pulled out of terminal 107, the voltage at terminal 107 is lower than the voltage at the gate of the transistor 108 (for example, 1.5 volts), causing transistor 108 to turn off and isolate the under-voltage detection circuitry. Further, transistor 106 is turned on, allowing current to flow through the transistor of optocoupler 144 (FIG. 2). If the current flowing through the transistor of optocoupler 144 at terminal 107 is less than the current supplied by the reference current source 102 at node 109, node 109 goes high. When node 109 is high, AND-gate 118 passes the clock signal from oscillator 114 to the set input of latch 122. Such setting of latch 122 in turn enables power transistor 126 to provide a pulse modulated signal to the transformer 134 in the absence of a fault condition. Alternatively, if the current flowing through the transistor of optocoupler 144 at terminal 107 is more than the current supplied by the reference current source 102 at node 109, node 109 goes low, thus disabling AND-gate 118 and power transistor 126. Although the feedback signal in this case is analog in form, it can also be a digital signal.

In one embodiment of a power supply, the current through the transistor of optocoupler 144 is digital in nature, where when the output voltage is below its regulated voltage there is no current through optocoupler 144, and when the output voltage is above the regulated voltage there is sufficient current through optocoupler 144 to pull terminal 107 low.

FIG. 2 illustrates a power supply employing the feedback and under-voltage handling circuitry of FIG. 1. The power supply of FIG. 2 has a transformer 134 with a primary winding and a secondary winding. A first input of the primary winding of the transformer 134 is connected to the positive input voltage terminal, while a second input of the primary winding of the transformer 134 is provided to a drain input D of a regulator 146 which embodies the circuit of FIG. 1. Additionally, the second input of the primary winding of the transformer 134 is connected to a clamp circuit consisting of a resistor 150 and a capacitor 152 connected in series to the input negative terminal. A source terminal S of the regulator 146 is also connected to the input negative terminal. Further, a by-pass terminal BP of regulator 146 is connected to one end of capacitor 148. The other end of the capacitor 148 is connected to the input negative terminal. Capacitor 148 gets charged by the by-pass terminal BP of regulator 146 during power up, and after the by-pass terminal reaches 5.8 volts, the power transistor 126 can start switching. Also a resistor 132 is connected between the input voltage terminal and a feedback/under-voltage terminal of regulator 146.

One output of the secondary winding of transformer 134 is provided to a Schottky diode 136 which is connected to a capacitor 138. The other output of the secondary winding of the transformer 134 is connected to the output negative terminal. The output of diode 136 is connected to a second Zener diode 140 at one end. The other end of Zener diode 140 is connected to a resistor 142, the other terminal of which is connected to the output negative terminal. The other end of the Zener diode 140 is connected to an optoisolator 144 whose output is connected between the feedback/under-voltage terminal of the regulator 146 and the output negative terminal.

Figure 3:
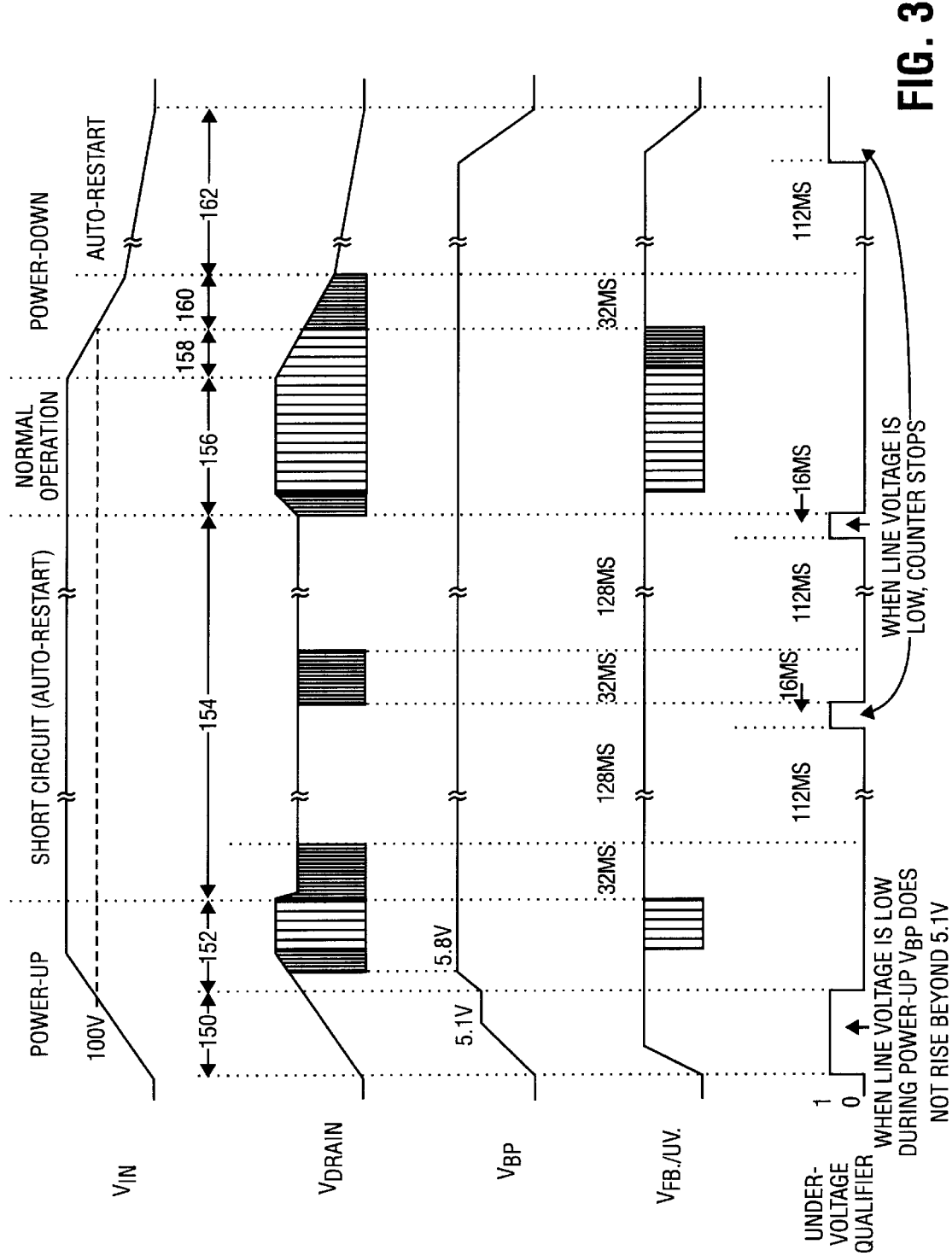
FIG. 3 is a timing diagram illustrating the operation of the present invention.

FIG. 3 is a timing diagram illustrating the operation of the circuits of FIGS. 1 and 2. Referring to all three figures in period 150, input voltage $V_{IN}$ rises from zero volts during power up. The input voltage rises from zero past a predetermined threshold to reach its full voltage. In this example, the threshold is set to be at about 100 volts. When the input voltage passes 100 volts, the drain of power transistor 126 begins to switch and to regulate the power output. Alternatively, when the input voltage is below 100 volts, the by-pass terminal of the regulator 146 is prevented from charging to its full voltage of about 5.8 volts. This is accomplished by holding the by-pass terminal voltage at about 5.1 volts using an internal voltage regulator (not shown) to prevent power transistor 126 from switching.

Period 152 begins after the input voltage has exceeded the threshold of 100 volts. In this period, the by-pass terminal voltage is allowed to rise to about 5.8 volts to complete the power up sequence. After the by-pass terminal voltage passes about 5.8 volts, power transistor 126 switches at its frequency of approximately 130 KHz in this example. Since the output voltage starts at zero volts, it will take a predetermined time period (typically two to ten milliseconds) for output capacitor 138 to charge up. Thus, at the beginning of period 152, no cycle is skipped. Once capacitor 138 reaches its full output voltage, it then enters a regulation mode and cycles may be skipped, as illustrated near the end of period 152. Here, the turn-on time associated with the auto restart circuit is longer than the normal power up time required to charge the output capacitor 138. Towards the end of the period 152, regulator 146 is regulating properly.

Auto-restart operation of the power supply is discussed next. Auto-restart operation is defined as alternatively enabling and disabling the power supply when it is experiencing one or more fault conditions such as over-load, open-loop, and short-circuit conditions. The disabling period is normally longer than the enabling period to limit excessive power delivery. The alternating enabling and disabling periods continue until the fault condition is removed.

Period 154 illustrates the auto-restart operation of regulator 146 when a short condition exists on the output of the power supply of FIG. 2 (D.C. OUT). Once the output is shorted, the output voltage collapses from its nominal voltage (in this case, about five volts) to ground. This condition demands that the regulator does not skip any switching cycles over a predetermined duration, typically 32 milliseconds. When the demand for full cycling exists for more than 32 milliseconds, regulator 146 detects a fault condition on the power supply output (D.C. OUT) and initiates the auto-restart operation where the power transistor 126 is prevented from switching for another period such as 128 milliseconds. The disabling of power transistor 126 during this period avoids the possibility of too much energy being shunted to output diode 136. After the expiration of the 128 milliseconds, regulator 146 retries starting the power supply for 32 milliseconds to see if the short condition has disappeared.

Before trying a restart, regulator 146 ensures that the input voltage is not low. Two possible situations may have created a continuous demand for cycling energy beyond the duration of 32 milliseconds: 1) a short condition or 2) an under-voltage condition. By checking for an input under-voltage condition before starting the power supply through the auto-restart circuit, the fault condition may be properly handled.

In period 156, the short condition is removed and the output is regulated as normal. In period 158, when power is removed, the line voltage starts to drop. Even as the line voltage drops, enough power exists to allow regulator 146 to provide a regulated output during period 158. Eventually, in period 160, the input voltage falls to a level where the output of the power supply goes out of regulation and the feedback signal demands the regulator 146 to provide maximum power (no skipped cycles) for the period of 32 milliseconds. Meanwhile, since the input voltage is low in period 160, the output starts to decrease and less energy is provided to the secondary winding of transformer 134. At the end of period 160, regulator 146 initiates the auto-restart operation and prevents transistor 126 from switching. In period 162, after the 128 millisecond period, regulator 146 checks the input voltage prior to restarting. If the input voltage is below the threshold, power transistor 126 is disabled to prevent the restart attempt to eliminate power-down glitches at the output. Such power-down glitches may result in equipment malfunction, as the output voltage may drop from 5 volts to zero volts, then 128 milliseconds later, the regulator 146 may retry and cause the output to rise from zero to approximately 2.5 volts, for example, before collapsing to ground. This could repeat several times depending on the rate of decay of input voltage.

As shown in this example, input voltage is checked during the power-up or during the off cycle of auto-restart operation. Detecting undervoltage prevents power transistor 126 from starting to switch. This operation eliminates power-up and power-down glitches that would otherwise occur as a result of auto-restart.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A circuit for detecting an under-voltage condition at a voltage input of a power supply, comprising:

a current mirror coupled to receive a current representing the voltage input of the power supply; and a reference current source to generate a reference current coupled to be received by the current mirror to generate an under-voltage signal when the reference current exceeds the current representing the voltage input of the power supply, the power supply being disabled when the under-voltage signal is generated.

2. The circuit of claim 1 wherein the under-voltage condition is detected during power up and/or during an off cycle of an auto-restart operation of the power supply.

3. The circuit of claim 1 further comprising a resistor coupled between the power supply voltage input and the current mirror.

4. The circuit of claim 1 further comprising a resistor coupled between the power supply voltage input and an electrical terminal.

5. The circuit of claim 4 wherein the current mirror further comprises:

a first transistor having a gate and a drain, the gate being coupled to the drain; and a second transistor having a gate, the gate of the second transistor coupled to the gate of the first transistor.

6. The circuit of claim 5 further comprising a first isolation transistor coupled between the electrical terminal and the first transistor drain.

7. The circuit of claim 6 further comprising:

a second current source; and a second isolation transistor coupled between the second current source and the electrical terminal to receive a feedback signal.

8. The circuit of claim 7 further comprising a latch coupled to the output of the second reference current source to receive the feedback signal.

9. The circuit of claim 7 wherein the electrical terminal receives both the feedback signal and the under-voltage signal.

10. The circuit of claim 9 wherein only one of the first and second isolation transistors conducts at a time.

11. A regulator circuit connected in series with a transformer primary winding to an input voltage, the regulator circuit comprising:

a resistor coupled to the input voltage, the resistor providing an input current representing the input voltage;

a current mirror coupled to the resistor for mirroring the input current; and a reference current source to generate a reference current coupled to be received by the current mirror to generate an under-voltage signal when the reference current exceeds the input current, the power supply being disabled when the under-voltage signal is generated.

12. The regulator circuit of claim 11 wherein the under-voltage signal is detected during power up and/or during an off cycle in an auto-restart operation of the regulator circuit.

13. The regulator circuit of claim 11 further comprising a first isolation transistor coupled between the resistor and the current mirror.

14. The regulator circuit of claim 11 wherein the current mirror further comprises:

a first transistor having a gate and a drain, the gate being coupled to the drain; and a second transistor having a gate, the gate of the second transistor coupled to the gate of the first transistor.

15. The regulator circuit of claim 13 further comprising a second reference current source.

16. The regulator circuit of claim 15 further comprising a second isolation transistor coupled between the second current source and the resistor.

17. The regulator circuit of claim 15 further comprising a latch coupled to the output of the second reference current source for receiving a feedback signal.

18. The regulator circuit of claim 16 wherein each of the first and second isolation transistors conducts one at a time.

19. The regulator circuit of claim 11, wherein the feedback signal and the under-voltage signal is received by one electrical terminal.

20. The regulator circuit of claim 11 further comprising a power switching transistor coupled to the under-voltage signal.

* * * * *